(12) United States Patent
Shen et al.

(10) Patent No.: US 11,806,759 B2
(45) Date of Patent: Nov. 7, 2023

(54) AUTOMATED AERO ALUMINUM SCRAP SORTING SYSTEM BASED ON LASER INDUCED BREAKDOWN (LIBS) TECHNIQUE

(71) Applicant: The Boeing Company, Chicago, IL (US)

(72) Inventors: Xuejing Shen, Beijing (CN); Ying Lin, Beijing (CN); Jia Liu, Beijing (CN); Rui Shen, Beijing (CN); Peng Xu, Biejing (CN); Yanbin Hu, Beijing (CN); Han Wu, Beijing (CN); Hui Wang, Beijing (CN); Jiaqing Zeng, Beijing (CN); Libin Yang, Beijing (CN); Ge Zhao, Beijing (CN); Jun Yao, Beijing (CN); Xiaoxia Shi, Beijing (CN)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/695,977

(22) Filed: Mar. 16, 2022

(65) Prior Publication Data
US 2022/0203406 A1    Jun. 30, 2022

Related U.S. Application Data

(62) Division of application No. 16/762,632, filed as application No. PCT/US2018/060932 on Nov. 14, 2018, now Pat. No. 11,311,915.

(30) Foreign Application Priority Data
Nov. 16, 2017    (CN) .......................... 201711139983.7

(51) Int. Cl.
*B07C 5/34*    (2006.01)
*B07C 5/342*    (2006.01)
(Continued)

(52) U.S. Cl.
CPC ................ *B07C 5/342* (2013.01); *B07C 5/02* (2013.01); *G01N 21/718* (2013.01)

(58) Field of Classification Search
CPC ........... G01N 21/718; G01N 2021/845; G01N 2021/06113; B07C 5/02; B07C 5/342; B07C 5/3427; B07C 2501/0054
See application file for complete search history.

(56) References Cited

U.S. PATENT DOCUMENTS 8,540,845 B2 *    9/2013    Ding ...................... G01N 21/55
                                                                            162/49
10,486,209 B2 *    11/2019    Wimmer .............. G01N 21/718
(Continued)

FOREIGN PATENT DOCUMENTS

DE    102015111890             1/2017
DE    102016122119 A1 *    5/2018    ............. B07C 5/342
(Continued)

OTHER PUBLICATIONS

Japan Patent Office, Office Action, with English translation, App. No. 2020-527739 (dated Nov. 22, 2022).
(Continued)

*Primary Examiner* — Joseph C Rodriguez
(74) *Attorney, Agent, or Firm* — Walters & Wasylyna LLC

(57) ABSTRACT

A fully automatic online aero aluminum sorting and recovery system based on LIBS (Laser Induced Breakdown Spectroscopy) technology, which belongs to the field of aero aluminum sorting and recovery technology, and is suitable for online sorting, detection and recovery of large batch of aero aluminum. The fully automatic online aero aluminum sorting system based on LIBS technology provided in the present invention consists of six portions: a sample feeding unit (1), a surface treatment unit (2), a material positioning unit (3), a LIBS analysis and detection unit (4), a transfer
(Continued)

unit (5) and a sorting and recovery unit (6). The system according to the invention can be used to realize the automatic online detection, sorting and recovery of aero aluminum, and the system does not have requirements on the surface condition of the recovered aero aluminum samples. The sorting accuracy rate is greater than 90% and the sorting rate is not less than 1 block per second.

20 Claims, 2 Drawing Sheets

(51) Int. Cl.
*B07C 5/02* (2006.01)
*G01N 21/71* (2006.01)

(56) References Cited

U.S. PATENT DOCUMENTS

| | | | |
|---|---|---|---|
| 11,311,915 B2* | 4/2022 | Shen | B07C 5/34 |
| 2003/0034281 A1 | 2/2003 | Kumar | |
| 2004/0000202 A1* | 1/2004 | Sjoquist | G01N 21/3563 |
| | | | 73/864.81 |
| 2004/0025654 A1* | 2/2004 | Olsen | B27B 31/08 |
| | | | 83/72 |
| 2004/0074822 A1* | 4/2004 | Horigane | G01N 1/36 |
| | | | 209/576 |
| 2014/0231314 A1 | 8/2014 | Pillkahn | |
| 2017/0173636 A1 | 6/2017 | Bitton | |
| 2017/0261437 A1 | 9/2017 | Buchter et al. | |
| 2018/0243800 A1* | 8/2018 | Kumar | G06N 20/00 |
| 2020/0368786 A1* | 11/2020 | Kumar | B07C 5/342 |
| 2022/0245571 A1* | 8/2022 | Bitton | G06Q 10/087 |

FOREIGN PATENT DOCUMENTS

| | | |
|---|---|---|
| JP | H11-253892 | 9/1999 |
| JP | 2007-010371 | 1/2007 |
| JP | 2011-089892 | 5/2011 |
| JP | WO2014-069096 | 5/2014 |
| JP | 2014-529679 | 11/2014 |

OTHER PUBLICATIONS

Japan Patent Office, Office Action, with English translation, App. No. 2020-527739 (dated Apr. 11, 2023).

* cited by examiner

AUTOMATED AERO ALUMINUM SCRAP SORTING SYSTEM BASED ON LASER INDUCED BREAKDOWN (LIBS) TECHNIQUE

PRIORITY

This application is divisional of U.S. Ser. No. 16/762,632 filed on May 8, 2020, which is the U.S. national phase entry of Intl. App. No. PCT/US2018/060932 filed on Nov. 14, 2018, which claims priority from Chinese Pat. App. No. 201711139983.7 filed on Nov. 16, 2017.

FIELD

The invention belongs to the field of aero aluminum alloy sorting and recovery technology, and in particular, provides a fully automatic online aero aluminum sorting and recovery system based on LIBS technology, which is suitable for automatic sorting, detection and recovery of large batch of aero aluminum.

BACKGROUND

Aluminum alloy is a class of non-ferrous metal structure materials which is the most widely used in the aviation industry, and different grades of aluminum alloys, due to the addition of alloy composition and different physical characteristics thereof, have relatively large differences in the aircraft applications. For example, the 2XXX-series aluminum-copper alloy is widely used in aircraft structures, and the 7XXX-series aluminum alloy has an ultra-high strength and thus is very suitable for aircraft frames and high-strength accessories.

With the retirements of aircrafts, a large number of aero aluminum alloys are required to be recovered. Many grades of aluminum are used on aircrafts, wherein the prices are greatly different. For example, in the current market, the price of the 2XXX-series of aluminum alloy is about 20,000 yuan (RMB)/ton, the prices of the 6XXX-series of aluminum alloy is about 40,000 to 50,000 yuan (RMB)/ton, while the price of the 7XXX-series of aluminum alloys is about 70,000 yuan (RMB)/ton. The common recovery method is to mix all of the different series of aluminum alloy removed from the aircrafts together to make into aluminum ingots, and the market price is only about 20,000 yuan (RMB)/ton. The value of aluminum ingots is greatly reduced.

Further, the current sorting and recovery technology commonly used for waste metal, such as wind separation, magnetic separation, flotation separation, gravity separation, eddy current separation, etc., cannot determine the element compositions of the waste metals, thus the sorting and recovery of different varieties of waste metal cannot be achieved according to the alloy composition, series or grades.

The Laser Induced Breakdown Spectroscopy (LIBS) technology mainly uses a pulse laser to excite a metal surface, so that the electrons in the atom are subjected to transition, resulting in the plasma cloud and releasing a spectrum, and then the spectral information of different elements can be obtained by a spectral detector. This technology can be used to analyze the metal composition, and accurately determine different materials of waste metal components according to the analysis results. The LIBS detection technology does not require a direct contact with the material, which is suitable for an online test and large-scale sorting, and has a high detection efficiency.

SUMMARY

A fully automatic online aero aluminum sorting and recovery system based on LIBS technology, consisting of six portions: a sample feeding unit (1), a surface treatment unit (2), a material positioning unit (3), an LIBS analysis and detection unit (4), a transfer unit (5) and a sorting and recovery unit (6), wherein the sample feeding unit (1) is connected to the transfer unit (5) via a chute and the arranged samples are slid onto a conveyor belt located on the transfer unit (5); the transfer unit (5) is configured to drive the conveying belt by using a stepper motor so as to connect various parts of the system together in series and realize the transfer movement of the samples in the various parts of the system; the surface treatment unit (2) is arranged at a rear end of the sample feeding unit (1), so that the surface of the samples is quickly treated by the surface treatment device, and then the samples are transferred by the transfer unit (5) to the material positioning unit (3); the material positioning unit (3) is configured to scan profile information of the samples by a three-dimensional morphology scanning sensor and transmits this information to the LIBS analysis and detection unit (4) via a cable; the samples are further transferred by the transfer unit (5) to the LIBS analysis and detection unit (4) which receives the synchronization signal from the material positioning unit (3) and emits laser according to the speed of the conveyor belt when the sample is passed, to irradiate the surface of the treated samples, and a spectral signal is introduced into a spectrometer by an optical fiber for collecting and processing, so as to determine grade information of the samples; the detected samples are transferred by the transfer unit (5) to the sorting and recovery unit (6), and based on the detected sample grade information, the samples are slid into respective baskets via the chute when passing through the different baskets.

Other aspects of the disclosed aero aluminum sorting and recovery system will become apparent from the following detailed description, the accompanying drawings and the appended claims.

DETAILED DESCRIPTION

Figure 1:
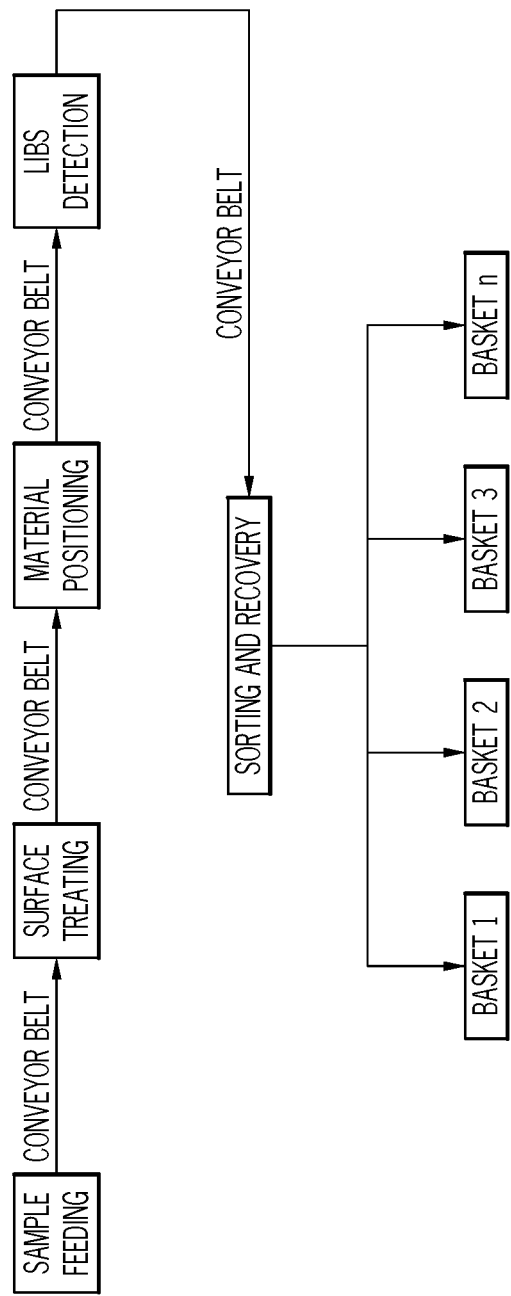
FIG. 1 is a block diagram of a fully automatic online aero aluminum sorting and recovery system based on the LIBS technology, which illustrates the connection relationship between the units of the system.

The invention provides a fully automatic online aero aluminum sorting and recovery system based on the LIBS technology. The system can realize automatic feeding and surface treatment, quickly detects and identifies the samples with respect to the grades to which the sample belongs through the LIBS analysis, and finally automatically sorts and recovers the samples according to different sample grades. The system has fast detection speed and high detection accuracy. It is suitable for automatic online detection and sorting of aero aluminum.

The present invention provides a fully automatic online aero aluminum sorting and recovery system based on LIBS technology, consisting of six portions: a sample feeding unit 1, a surface treatment unit 2, a material positioning unit 3, a LIBS analysis and detection unit 4, a transfer unit 5 and a sorting and recovery unit 6.

Wherein the sample feeding unit 1 is connected to the transfer unit 5 via a chute and the arranged samples are slid onto a conveyor belt located on the transfer unit 5; the transfer unit 5 is configured to drive the conveying belt by using a stepper motor so as to connect various parts of the system together in series and realize the transfer movement of the samples in the various parts of the system; the surface treatment unit 2 is arranged at a rear end of the sample feeding unit 1, so that the surface of the samples is quickly treated by the surface treatment device, and then the samples are transferred by the transfer unit 5 to the material positioning unit 3; the material positioning unit 3 is configured to scan profile information of the samples by a three-dimensional morphology scanning sensor and transmits this signal to the LIBS analysis and detection unit 4; the samples are further transferred by the transfer unit 5 to the LIBS analysis and detection unit 4 which receives the synchronization signal from the material positioning unit 3 and emits laser when the sample is passed, to irradiate the surface of the treated samples, and a spectral signal is introduced into a spectrometer by an optical fiber for collecting and processing, so as to determine grade information of the samples; the detected samples are transferred by the transfer unit 5 to the sorting and recovery unit 6, and based on the detected sample grade information, the samples are slid into respective baskets via the chute when passing through the different baskets.

Figure 2:
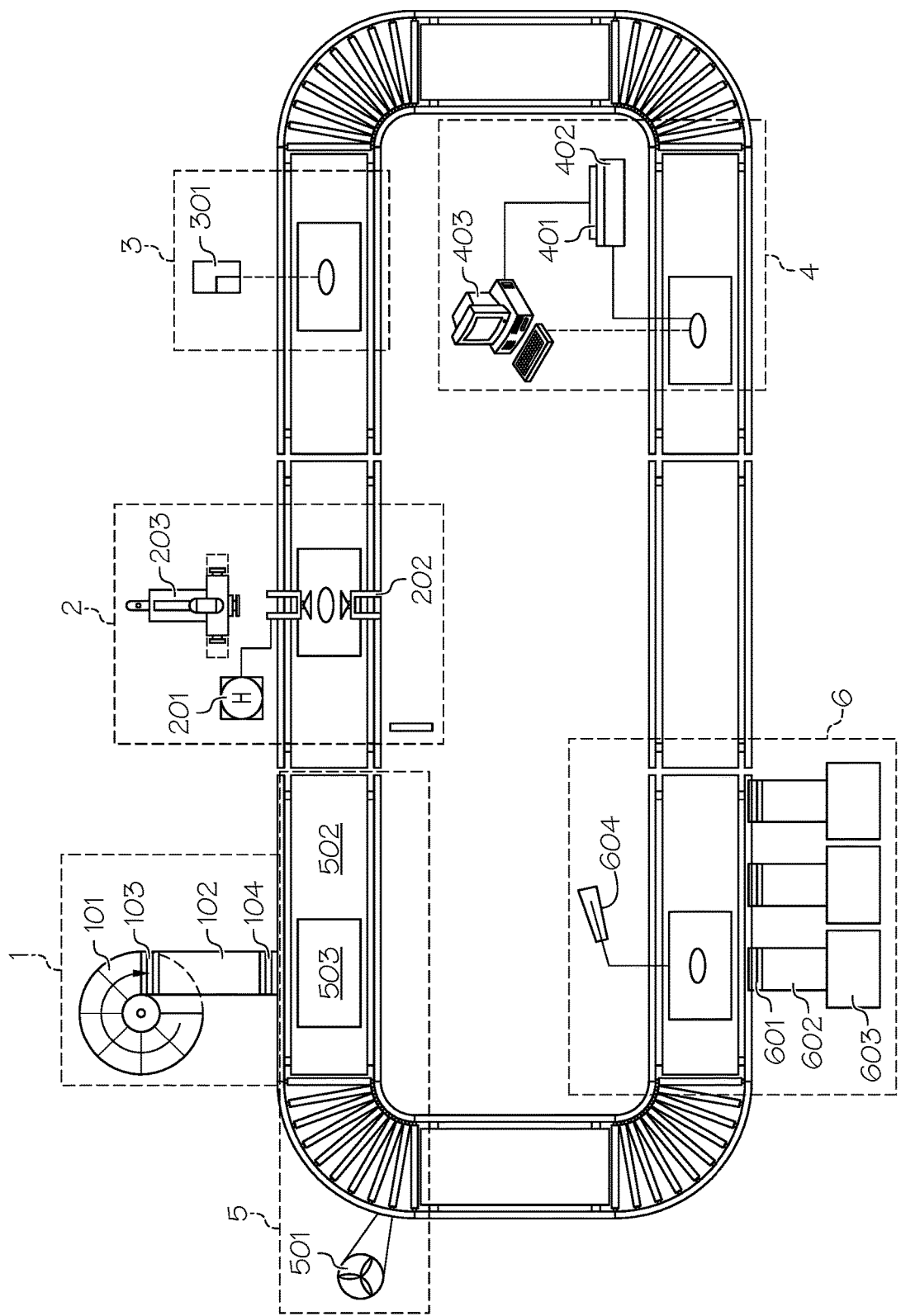
FIG. 2 is a structural diagram of a fully automatic online aero aluminum sorting and recovery system based on the LIBS technology, which shows a vibration plate 101, a chute 102, a photoelectric switch 201, a clamping device 202, a high-speed grinding device 203, a three-dimensional morphology scanning sensor 301, a pulse laser 401, a laser light path 402, a fiber optic spectrometer 403, a computer 404 provided with an LIBS analysis software, a stepper motor 501, a conveyor belt 502, a tray 503, baffles 601, chutes 602, baskets 603, and a pneumatic device 604.

FIG. 1 illustrates the connection relationship between the units of the present invention; and FIG. 2 illustrates the layout of the units of the present invention.

The sample feeding unit 1 provided in the present invention is configured to sequentially arrange the waste aero aluminum samples to avoid overlapping; the material feeding unit consists of a vibrating plate and a chute that is mounted at an outlet position of the vibrating plate; during material feeding process, the samples are placed into the vibration plate and move to an outlet of the vibration plate by vibration, meanwhile the materials are arranged in a row with the effect of the vibration plate; the vibration plate outlet and chute outlet are each provided with a baffle, so that after the materials enter into the chute through the vibration plate outlet, the baffles are closed to prevent further entry of material; when a tray on the conveyor belt reaches the bottom of the chute, the chute baffle is opened for the material falling and then closed, with a next round of material feeding process started thereafter; during the material feeding process, the vibrating plate is consistently in a vibration state, and when the outlet baffle is closed, the materials will be swept off onto the vibration plate to make the material feeding process continue; the two baffles are in a chain control, so that when the chute has material therein, the vibration plate outlet baffle is consistently in the closed state, and only when the chute has no material therein and the chute baffle is in the closed state, the vibration plate outlet baffle is opened.

The surface treatment unit 2 provided in the present invention is configured for quickly treating the surface of the aero aluminum samples having oil, paint, coating, etc. to obtain a smooth and clean detection surface; the surface treatment unit consists of photoelectric switches, a clamping device and a high speed grinding device; the photoelectric switches are mounted on both sides of the conveyor belt upstream of the clamping device; when a sample passes, the photoelectric switches are blocked, and such information is supplied to the clamping device via a signal line; the clamping device is configured to fix the sample in the center of the transfer tray when the sample arrives; at the same time, the high-speed grinding device directly above the clamping device falls down and grinds off the paint or coating on the sample surface, with a grinding thickness not less than 500 μm and a grinding area not less than 1 $mm^2$, so that the sample surface to be detected becomes a smooth and clean metal surface; after the grinding, the clamping device loosens the sample and the sample is carried to the next working procedure.

The material positioning unit 3 provided in the present invention is configured for determining the shape and height information of the material by scanning the surface profile information of the sample using a three-dimensional morphology scanning sensor, recording the sample profile and height information, and sending such information to the LIBS detection unit 4 via a cable.

The LIBS analysis and detection unit 4 provided in the present invention is configured for quickly detecting and identifying the grade of the sample, and consists of a pulse laser, a laser light path, a fiber optic spectrometer, and a computer provided with an LIBS analysis software, etc.; wherein after the sample is delivered to a detection area by the conveyor belt, the laser pulse from the pulse laser is focused through the laser light path to excite the surface of the treated sample, the spectrometer receives the spectral information produced by exciting the characteristic element via the optical fiber, and the output signal of the spectrometer is communicated to the computer via a network cable; the computer provided with the LIBS analysis software parses the received spectral information in real time, sorting and identifying it, and write the results of sorting and identification into an electronic label carried on the sample tray. The LIBS analysis and detection unit can achieve an accuracy rate of detection of no less than 90% at a detection speed of 1 block/second.

The transfer unit 5 provided in the present invention enables the system to achieve the automatic transmission and consists of a stepper motor, a conveyor belt and a tray, and the conveyor belt is arranged in a loop form; a chain transmission is utilized between the stepper motor and the conveyor belt to ensure a stable and reliable delivery; the tray is placed on the conveyor belt and is moved in steps, with each moving step length is the length of the tray; an electronic label is provided on the tray, into which the LIBS analysis and detection unit 4 is responsible for writing the sorting information of the sample in the tray.

The sorting and recovery unit 6 provided in the present invention performs automatic sorting and recovery of aluminum samples of different grades and consists of a number of delivery devices containing different sample sorting information and a pneumatic device; the delivery system includes baffles, chutes and baskets; each delivery port is provided with a baffle and is connected to a respective basket via a chute; an identification device at the delivery port can decide whether or not to perform delivery according to the contents of the electronic label on the tray; when the tray with the information consistent with the delivery port information passes, the baffle is opened and the pneumatic device is jacked up to deliver the sample into the basket.

Compared with the prior art, the present invention has the following advantages: the present invention provides a fully automatic online aero aluminum sorting and recovery system based on the LIBS technology, and can achieve accurate and fast online sorting analysis according to the alloy composition or grade. The sample feeding, transferring, surface treatment, analysis and sorting process can be automatically achieved. The system has fast analysis speed and high sorting accuracy.

FIG. 2 is a specific embodiment of the present invention, and the specific embodiments of the invention will be described in further detail with reference to FIG. 2. The implementation process and effects of the present invention will be described by way of example, and other similar sorting analysis problems can be solved by reference, but are not limited to the examples.

In the present embodiment, three series of waste aero aluminum, i.e., 2XXX-series, the 7XXX-series, and the cast aluminum A356, are selected for sorting, and other types of series for sorting can also be added according to the practical needs. The 2XXX-series aluminum alloy mainly contains copper of the highest content, the 7XXX-series aluminum alloy mainly contains alloy elements of zinc and magnesium, and the A356 alloy is a typical aluminum silicon magnesium alloy. The sample height ranges from 1 cm to 10 cm, and the shape is relatively irregular. The surface has paint or coating layer of a thickness not less than 500 μm. The number of samples is 3112 blocks. The sample is sorted by using a fully automatic online aero aluminum sorting and recovery system based on the LIBS technology of the present invention.

The fully automatic online aero aluminum sorting and recovery system based on the LIBS technology of the present embodiment comprises a sample feeding unit 1, a surface treatment unit 2, a material positioning unit 3, a LIBS analysis and detection unit 4, a transfer unit 5 and a sorting and recovery unit 6, wherein:

The material feeding unit 1 consists of a vibrating plate 101 and a chute 102 that is mounted at an outlet position of the vibrating plate. During material feeding process, the samples are placed into the vibration plate and move to an outlet of the vibration plate by vibration, meanwhile the materials are arranged in a row with the effect of the vibration plate. The vibration plate outlet and chute outlet are each provided with a baffle, so that after the materials enter into the chute through the vibration plate outlet, the vibration plate baffle 103 are closed to prevent further entry of material. When a tray on the conveyor belt reaches the bottom of the chute, the chute baffle 104 is opened for the material falling and then closed, with a next round of material feeding process started thereafter. During the material feeding process, the vibrating plate is consistently in a vibration state, and when the vibration plate baffle is closed, the materials will be swept off onto the vibration plate to make the material feeding process continue. The two baffles are in a chain control, so that when the chute has material therein, the vibration plate baffle is consistently in the closed state, and only when the chute has no material therein and the chute baffle is in the closed state, the vibration plate baffle is opened.

The surface treatment unit 2 consists of a photoelectric switch 201, a clamping device 202 and a high speed grinding device 203 (in this example, a high-speed milling cutter). The photoelectric switches are mounted on both sides of the conveyor belt upstream of the clamping device. When a sample passes, the photoelectric switches are blocked, and such information is supplied to the clamping device via a signal line. The clamping device is configured to fix the sample in the center of the transfer tray when the sample arrives; at the same time, the high-speed grinding device directly above the clamping device falls down and grinds off the paint or coating on the sample surface, with a grinding thickness not less than 500 μm and a grinding area not less than 1 mm², so that the sample surface to be detected becomes a smooth and clean metal surface. After the grinding, the clamping device loosens the sample and the sample is carried to the next working procedure.

The material positioning unit 3 determines the shape and height information of the material by scanning the surface profile information of the sample using a three-dimensional morphology scanning sensor 301, recording the sample profile and height information, and sending such information to the LIBS detection unit 4 via a cable.

The LIBS analysis and detection unit 4 consists of a pulse laser 401, a laser light path 402, a fiber optic spectrometer 403, and a computer 404 provided with a LIBS analysis software. After the sample is delivered to a detection area by the conveyor belt, the laser pulse from the pulse laser is focused through the laser light path to excite the surface of the treated sample, the spectrometer receives the spectral information produced by exciting the characteristic element via the optical fiber, and the output signal of the spectrometer is communicated to the computer via a network cable. The computer provided with the LIBS analysis software parses the received spectral information in real time, sorting and identifying it, and write the results of sorting and identification into an electronic label carried on the sample tray. The LIBS analysis and detection unit can achieve an accuracy rate of detection of no less than 90% at a detection speed of 1 block/second.

The transfer unit 5 consists of a stepper motor 501, a conveyor belt 502 and a tray 503, with the conveyor belt arranged in a loop form. A chain transmission is utilized between the stepper motor and the conveyor belt to ensure a stable and reliable delivery. The tray is placed on the conveyor belt and is moved in steps, with each moving step length is the length of the tray. An electronic label is provided on the tray, into which the LIBS analysis and detection unit 4 is responsible for writing the sorting information of the sample in the tray.

The sorting and recovery unit 6 comprises a delivery system for three different samples (2XXX, 7XXX, A356) and a pneumatic device 604. The delivery system includes baffles 601, chutes 602 and baskets 603. Each delivery port is provided with a baffle and is connected to a respective basket via a chute. An identification device at the delivery port can decide whether or not to perform delivery according to the contents of the electronic label on the tray. When the tray with the information consistent with the delivery port information passes, the baffle is opened and the pneumatic device is jacked up to deliver the sample into the basket.

Sorting and recycling process: the waste aero aluminum samples (hereinafter referred to as samples) are dumped on a sample feeding unit 1, and the sample feeding unit arranges the samples in a row which enter through a chute into a transfer unit 5 consisting of a number of transfer trays. The transfer unit is driven by a motor to rotate in a constant speed and carry the samples to the next working procedure unit. The surface treatment unit 2 grinds off the paint or coating layer on the surface of the sample by rapid mechanical grinding, so that the sample surface to be detected becomes a smooth and clean metal surface. When the sample passes through the material positioning unit 3, the profile information of the sample is scanned by a three-dimensional morphology scanning sensor and sent to the LIBS analysis and detection unit 4 and informs the LIBS analysis unit when the sample passes and when the laser is emitted for detection. The LIBS analysis and detection unit 4 analyzes the characteristic element information in the sample, distinguishes the samples according to the differences in the elemental composition of the different grade samples, and informs the sorting and recovery unit 6 to pour the sample into the basket corresponding the grade when it is transferred to the basket, so as to complete the sample sorting.

A total of 3112 blocks of aero aluminum samples are sorted by a fully automatic online aero aluminum sorting system based on the LIBS technology, and the test time for each sample block is not more than 1 second. The overall sorting results are as follows:

| Type | Number of Samples | Number Misjudgment | Accuracy Rate |
| --- | --- | --- | --- |
| 2xxx | 936 | 4 | 99.57% |
| 7xxx | 1176 | 1 | 99.91% |
| A356 | 1000 | 1 | 99.90% |

Although various aspects of the disclosed aero aluminum sorting and recovery system have been shown and described, modifications may occur to those skilled in the art upon reading the specification. The present application includes such modifications and is limited only by the scope of the claims.

What is claimed is:

1. A method for sorting metal samples, the method comprising:
   at least temporarily fixing a metal sample on a transport surface carrying the metal sample along a transport path through a sorting and recovery system, the fixing performed by a clamping device of a surface treatment unit along the transport path;
   during the fixing, grinding a surface area of the metal sample at a grinding device of the surface treatment unit;
   analyzing the surface of the metal sample for compositional data using a LIBS analysis and detection unit to obtain detected compositional data; and
   transferring the metal sample from the transport path to a recovery bin based upon the detected compositional data, the recovery bin having been previously designated for recovery of metal compositions associated with the detected compositional data.

2. The method of claim 1 wherein the metal samples comprise aluminum.

3. The method of claim 1 wherein the metal samples comprise metal samples of 2XXX-series aluminum, metal samples of 7XXX-series aluminum, and metal samples of A356 aluminum.

4. The method of claim 1 wherein the transferring the metal sample from the transport path to a recovery bin comprises:
   transferring the metal sample from the transport path to a first recovery bin previously designated for recovery of 2XXX-series aluminum when the detected compositional data indicates the metal sample is 2XXX-series aluminum,
   transferring the metal sample from the transport path to a first recovery bin previously designated for recovery of 7XXX-series aluminum when the detected compositional data indicates the metal sample is 7XXX-series aluminum, and
   transferring the metal sample from the transport path to a first recovery bin previously designated for recovery of A356 aluminum when the detected compositional data indicates the metal sample is A356 aluminum.

5. The method of claim 1 wherein the grinding achieves a grinding thickness of at least 500 μm.

6. The method of claim 1 wherein the grinding yields a grinding area of at least 1 mm$^2$.

7. The method of claim 1 further comprising scanning the surface of the metal sample with a sensor.

8. The method of claim 1 wherein the scanning comprises scanning the surface of the metal sample with a three-dimensional morphology scanning sensor.

9. The method of claim 1 wherein the analyzing comprises exciting the surface of the metal sample with a laser.

10. The method of claim 1 further comprising feeding the metal sample onto the transport path via a transfer unit.

11. The method of claim 10 wherein the feeding comprises positioning the metal sample on a conveyor belt of the transfer unit via a chute.

12. The method of claim 1 further comprising identifying the metal sample based upon the detected compositional data to obtain sorting and identifying information for transfer of the metal sample to the recovery bin from a plurality of recovery bins.

13. The method of claim 12 further comprising writing the sorting and identifying information to an electronic label on a tray carrying the metal sample along the transport path.

14. A method for sorting a plurality of metal samples, the method comprising:
   at least temporarily fixing a metal sample of the plurality of metal samples on a transport surface carrying the metal sample and at least a portion of the plurality of metal samples along a transport path through a sorting and recovery system, the fixing performed by a clamping device of a surface treatment unit along the transport path;
   during the fixing, grinding a surface area of the metal sample at a grinding device of the surface treatment unit to yield a treated surface area;
   exciting the treated surface area of the metal sample with a pulse laser to yield a plasma cloud and to release a spectrum;
   analyzing the spectrum to obtain detected compositional data; and
   based on the detected compositional data, transferring the metal sample from the transport path to a recovery bin, the recovery bin having been previously designated for recovery of metal compositions associated with the detected compositional data.

15. The method of claim 14 further comprising ascertaining the three-dimensional morphology of the surface of the metal sample prior to the exciting.

16. A method for sorting metal samples, the method comprising:
   at least temporarily fixing a metal sample on a transport surface carrying the metal sample along a transport path through a sorting and recovery system, the fixing performed by a clamping device of a surface treatment unit along the transport path;

during the fixing, grinding a surface area of the metal sample at a grinding device of the surface treatment unit; and analyzing the surface area of the metal sample for compositional data using a LIBS analysis and detection unit to obtain detected computational data.

17. The method of claim 16 further comprising:

at a first delivery port, deciding to not deliver the metal sample to a first recovery bin based on the detected compositional data, the first recovery bin having been previously designated for recovery of metal compositions associated with compositional data differing from the detected compositional data.

18. The method of claim 16 further comprising:

at a second delivery port, deciding to deliver the metal sample to a second recovery bin based on the detected compositional data, the second recovery bin having been previously designated for recovery of metal compositions associated with the detected compositional data; and at the second delivery port, transferring the metal sample from the transport path to the second recovery bin based on the detected compositional data.

19. The method of claim 16 further comprising:

identifying the metal sample based on the detected compositional data to obtain sorting and identifying information for transfer of the metal sample to a recovery bin of a plurality of recovery bins; and writing the sorting and identifying information to an electronic label on a tray carrying the metal sample along the transport path.

20. The method of claim 19 further comprising:

at a plurality of delivery ports, deciding which of the plurality of recovery bins to which the metal sample is to be transferred based on the sorting and identifying information of the electronic label to obtain a select recovery bin, the select recovery bin having been previously designated for recovery of metal compositions associated with the detected compositional data; and at the plurality of delivery ports, transferring the metal sample from the transport path to the select recovery bin based on the detected compositional data and the sorting and identifying information.

* * * * *